(12) United States Patent
Drolshagen et al.

(10) Patent No.: US 7,896,523 B2
(45) Date of Patent: Mar. 1, 2011

(54) TARGET ILLUMINATOR FOR NIGHT-VISION DEVICES

(75) Inventors: Juergen Drolshagen, Cologne (DE); Thiemo Komischke, Koblenz (DE); David Heckner, Koblenz (DE)

(73) Assignee: Picotronic GmbH, Koblenz (DE)

( * ) Notice: Subject to any disclaimer, the term of this patent is extended or adjusted under 35 U.S.C. 154(b) by 843 days.

(21) Appl. No.: 11/696,085

(22) Filed: Apr. 3, 2007

(65) Prior Publication Data
US 2008/0240199 A1 Oct. 2, 2008

(30) Foreign Application Priority Data
Apr. 3, 2006 (DE) ............... 20 2006 005 516 U
Dec. 19, 2006 (EP) ............... 06126553

(51) Int. Cl.
*G20B 27/20* (2006.01)
(52) U.S. Cl. ............ 362/259; 362/268; 362/281
(58) Field of Classification Search ......... 362/109, 362/259, 268, 281, 280, 293, 319, 323
See application file for complete search history.

(56) References Cited

U.S. PATENT DOCUMENTS

| 5,042,048 | A * | 8/1991 | Meyer ............... 362/109 |
| 6,984,061 | B1 * | 1/2006 | Soderberg et al. ....... 362/259 |
| 2002/0154498 | A1 * | 10/2002 | Cramer et al. ........... 362/259 |

* cited by examiner

*Primary Examiner*—Y My Quach Lee
(74) *Attorney, Agent, or Firm*—Muncy, Geissler, Olds & Lowe, PLLC

(57) ABSTRACT

The invention relates to a target illuminator (1) for night-vision technology, comprising a laser source (2), the radiation power of the laser source being at least 15 mW, in particular from 100 to 500 mW, and the laser source being formed for emission of radiation having a wavelength $\lambda$ of from 700 nm to 1400 nm, and a second optical system (4) for the divergent emission of the radiation. Furthermore, the target illuminator (1) has a first optical system (3) arranged down-circuit of the laser source (2) and before the second optical system (4) and intended for increasing the beam cross-section before entry into the second optical system (4) to a diameter of at least 5 mm and for guiding the beam into the second optical system (4). The angle of divergence (10) of the emitted radiation can be varied in a defined manner, the variability being limited for ensuring a minimum divergence.

16 Claims, 5 Drawing Sheets

TARGET ILLUMINATOR FOR NIGHT-VISION DEVICES

This non-provisional application claims priority under 35 U.S.C. §119 on German Patent Application No. DE 20 2006 005 516.9, which was filed on Apr. 3, 2006, and on European Patent Application No. EP 06126553.4, which was filed on Dec. 19, 2006, each of which is herein incorporated by reference in its entirety.

FIELD OF THE INVENTION

The invention relates to a target illuminator for night-vision technology.

BACKGROUND OF THE INVENTION

Illumination devices for night-vision technology as target illuminators have long been known. They permit high-contrast image production even when the available light is insufficient. With the use of active infrared illumination, unnoticed observation of people and animals is possible owing to the high sensitivity of night-vision devices in the near infrared range.

Generic illumination devices use a diode (LED) emitting light in the infrared range and having a down-circuit collimation optical system. However, the efficiency of LEDs is lower in comparison with the efficiency of, for example, laser diodes and hence the energy consumption is correspondingly higher at the same radiant power. Furthermore, illumination of a target under difficult conditions, such as mist, by means of such illumination devices is poorer than is desirable and possible in principle. Moreover, owing to the very divergent radiation characteristic of an LED, the optical design of such illumination devices is complicated.

A further known possibility is the use of a laser diode as a source of the illumination device. However, owing to the resultant radiation intensity and radiation characteristic, laser infrared illumination systems known to date either constitute a considerable danger to the eye and are therefore classified as laser class 3B according to the standard DIN EN 60825-1 2001-11, for example in Germany, or provide weak illumination. In the case of laser systems of laser class 3B, the emission of optical and acoustic signals is required on putting into operation, inter alia as a radiation warning. Use of a laser illumination device of laser class 3B in conjunction with night-vision devices which, inter alia are intended to permit unnoticed observation of people and animals is therefore not suitable and contradicts the actual purpose of the arrangement.

SUMMARY OF THE INVENTION

The object of the invention is to provide a target illuminator for night-vision devices which permits the illumination of the "target object" over a large distance without constituting a danger to people or animals. In particular, there should be no necessity for emitting warning signals in order to permit unnoticed observation of the target object.

There are several classification systems for assessing the danger to an eye from a laser device. One possible classification system is the standard DIN EN 60825-1 2001-11. Below, the eye safety of a laser device is assessed according to this standard.

In order to exclude any danger to an eye in the case of a laser illumination device, even in the case of a glance into a laser source by an eye present directly in the beam path, a certain irradiation value must not be exceeded. The maximum permissible irradiation value, referred to below as MPI value, is dependent on the type of irradiation and the properties of the laser source. Laser illumination devices known to date are designed as systems comprising a one-stage optical system, with the result that sharp focusing of the source in the eye of an observer is possible. Such sharp focusing of the source constitutes considerable danger to the eye even at low radiant powers. On the other hand, a laser illumination device which represents an extensive source and therefore does not permit sharp focusing of the source is less dangerous to the eye in spite of a higher radiant power. For this reason, the MPI value for extensive sources is determined differently to point sources.

The MPI value relevant for extensive sources is stated in W/m² and calculated as a function of the wavelength $\lambda$ of the radiation, always stated below in the unit nanometers, and the angular extension $\alpha$ of the apparent source, always stated below in the unit millirads. The angular extension describes the angle $\alpha$ at which the apparent source appears from a point in space. For an analysis of the maximum permissible irradiation, the angular extension $\alpha$ is determined by the observation distance from the apparent source, but by a distance not less than 100 mm, the apparent source representing the true or apparent object which produces as small as possible an image on the retina of an eye. For this purpose, the radiant power is reduced to 63% of the original radiant power by means of an aperture, and the angular extension $\alpha$ at a distance of 100 mm is determined from the diameter d of this aperture as follows:

$$\alpha = \arctan\left(\frac{d/2}{100 \text{ mm}}\right) \cdot 2 \tag{1}$$

In the case of the emission of divergent laser radiation and an angular extension greater than 1.5 mrad, the MPI value is multiplied, inter alia, by a factor $C_6$ which is dependent on the angular extension and is between 1 and 66.7, in contrast to the calculation of the MPI value for point sources. This increase in the MPI value where an extensive laser source is present is permissible since the danger to the eye from extensive laser sources is smaller in comparison with point sources.

The MPI value for laser radiation having a wavelength of $700 \leq \lambda < 1400$, an angular extension of the apparent source of $\alpha > 1.5$ and a duration of action of $t > T_2$, where $T_2$ is defined below, is calculated according to DIN EN 60825-1 2001-11, as follows:

$$MZB = 18 \cdot C_4 \cdot C_6 \cdot C_7 \cdot T_2^{-0.25} \text{ W/m}^2, \tag{2}$$

where $C_4$ and $C_7$ are directly dependent on the wavelength and $T_2$ on the angular extension of the apparent source.

Specifically, the factors are calculated as follows:

$$C_4 = \begin{cases} 10^{0.002 \cdot (\lambda-700)} & \text{for } 700 \leq \lambda < 1050 \\ 5 & \text{for } 1050 \leq \lambda \leq 1400 \end{cases} \tag{3}$$

$$C_7 = \begin{cases} 1 & \text{for } 700 \leq \lambda < 1150 \\ 10^{0.018 \cdot (\lambda-1150)} & \text{for } 1150 \leq \lambda < 1200 \\ 8 & \text{for } 1200 \leq \lambda \leq 1400 \end{cases} \tag{4}$$

$$T_2 = \begin{cases} 10 \cdot 10^{(\alpha-1.5)/98.5} s & \text{for } 1.5 < \alpha \leq 100 \\ 100 s & \text{for } 100 < \alpha \end{cases} \tag{5}$$

-continued $$C_6 = \begin{cases} \alpha/1.5 & \text{for } 1.5 < \alpha \leq 100 \\ 66.7 & \text{for } 100 < \alpha \end{cases} \quad (6)$$

For determining the eye safety of a laser source, the radiant power within the circular aperture of 7 mm diameter is measured at the point of greatest danger or at least at a distance of 100 mm from the apparent laser source. The intensity of irradiation, which must not exceed the MPI value calculated according to (2) in order to ensure eye safety, is determined from this measured value. The emitted maximum radiation power at which eye safety is ensured in any case therefore also depends on the magnitude of the angle of divergence of the emitted radiation since the beam density decreases as the distance from the apparent source increases, depending on the angle of divergence.

Below, beam cross-section is understood as meaning the diameter of a circular aperture which reduces the radiant power in the laser beam to 63%.

According to the invention, a laser source having a radiant power of at least 15 mW, in particular from 100 to 500 mW, is used. At least two optical systems are arranged down-circuit of the laser source. The emission of the laser source is caused to diverge in the defined manner by the first optical system so that the beam has a beam cross-section of at least 5 mm before entering the second optical system, and the beam density is thus reduced. Furthermore, the beam is guided by the first optical system into the second optical system in such a way that the latter is substantially completely, in particular uniformly, illuminated. The laser radiation is emitted in a defined divergent manner by a second optical system down-circuit of the first optical system. Parts of the first and/or of the second optical system are formed so as to be adjustable to a limited extent so that the angle of divergence of the emitted radiation can be changed, a minimum angle of divergence being ensured by limitation of adjustment. Sharp focusing of the laser source by the eye as a one-lens system is not possible by this illumination device according to the invention. Thus, the illumination device is an extensive source in which the danger to the eye is less than in the case of light sources of the same intensity. According to the invention, the increased MPI value applicable especially to extensive sources is now not exceeded by the emitted radiation of the illumination device, measured at 100 mm distance from the apparent source with a circular aperture of 7 mm diameter present in the beam path of the laser radiation emitted divergently.

Thus, in spite of the high irradiation power of the laser illuminator, which permits the illumination of the target object over a large distance through a high level of brightness, an arrangement is provided which constitutes no danger to the eye. Laser illumination devices of the prior art either provide weak illumination or constitute a danger to people and animals.

The increase in the beam cross-section and the reduction in the beam density of the emission of the laser source in the first optical system can, as described in FIG. 2, be effected by one or more lenses. However, the first optical system can likewise alternatively or additionally contain further optical elements, such as, for example, a scattering lens, a hologram or a gradient optical system.

A further possible embodiment of the illumination device has an additional, second radiation source, in particular a second laser source for emitting laser radiation having a second wavelength λ which differs from the wavelength of the first laser source and is from 700 nm to 1400 nm. By means of a switch element, the first and/or the second source can be switched on.

The target illuminator according to the invention is suitable for use with all types of night-vision technologies which are formed for receiving electromagnetic radiation of at least one wavelength from the wavelength range from 700 to 1400 nm and in particular make this radiation visible, such as, for example, digital CCD systems.

BRIEF DESCRIPTION OF THE DRAWINGS

A target illuminator according to the invention for night-vision devices is described in more detail below, purely by way of example, with reference to working examples shown schematically in the drawing. Specifically.

DETAILED DESCRIPTION

Figure 1:
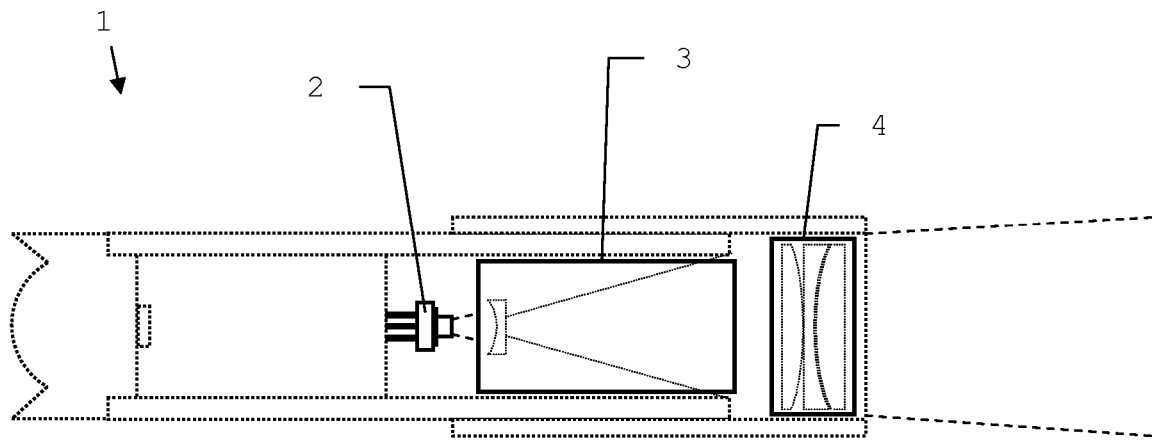
FIG. 1 shows an illumination device according to the invention, comprising laser source and first and second optical systems.

FIG. 1 shows an embodiment of an illumination device 1 according to the invention. The first optical system 3 for diverging the beam emitted by the laser source 2 and producing the desired beam cross-section is down-circuit of the laser source 2, which emits radiation in the wavelength range from 700 nm to 1400 nm and with a radiant power of at least 15 mW, in particular from 100 to 500 mW. The beam is caused to diverge by the first optical system 3 so that the beam cross-section before entry into the second optical system 4 has a diameter of at least 5 mm and is guided into the second optical system 4 so that the latter is substantially completely; in particular uniformly, illuminated. Components of the first and/or of the second optical system are mounted so as to be displaceable to a limited extent along the common optical axis of the first and second optical systems. By displacing these components along this axis, the angle of divergence of the emitted radiation is changed, a defined minimum divergence being ensured by the limitation (not shown) of the displacement distance.

Figure 2:
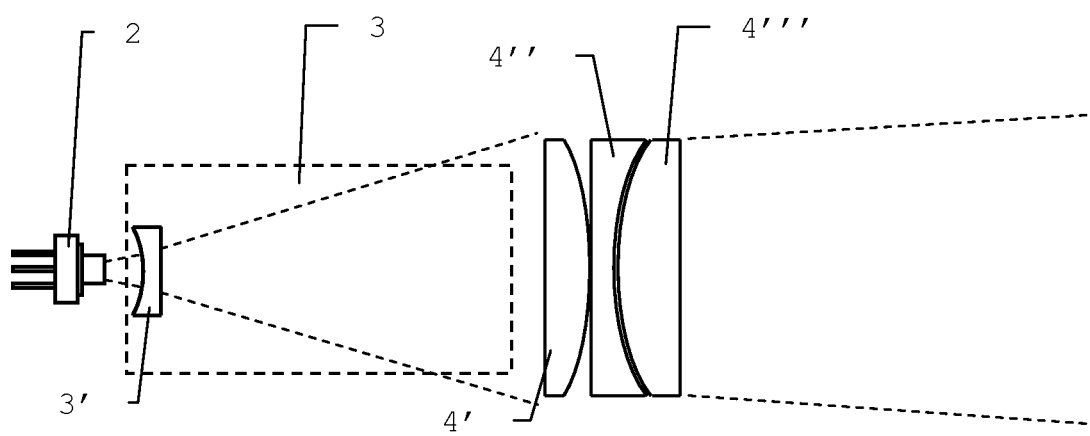
FIG. 2 shows components of the illumination device according to the invention.

FIG. 2 shows, in more detail, embodiments according to the invention of the first optical system 3 and of the second optical system 4. The first optical system 3 consists of a planoconcave lens as negative lens 3' close to the laser source 2, such as, for example, at a distance of 1.6 mm, which causes the beam to diverge in a defined manner. As a result of the divergence of the beam by means of the first optical system 3, the beam density is reduced and a beam cross-section before entry of the beam into the second optical system of at least 5 mm is produced in a defined manner, such as, for example, 13 mm. The first optical system 3 guides the beam into the second optical system so that the latter is illuminated completely, in particular uniformly, in any position possible by the displacement.

The second optical system shown here purely by way of example as a three-lens system comprising a positive lens 4', a negative lens 4" and a positive lens 4'" is arranged down-circuit of the first optical system and emits the beam with a beam cross-section of at least 5 mm, such as, for example, 13 mm, diverging in a defined manner. By displacing the second optical system 4 along its optical axis, the angle of divergence is changed.

In addition or alternatively to the component 3' shown for the first optical system 3, the first optical system 3 may have further optical elements not shown, such as, for example, a scattering lens, a hologram, a gradient optical system or a cylindrical lens. The components of the second optical system may be mechanically connected to form a lens system.

Figure 3:
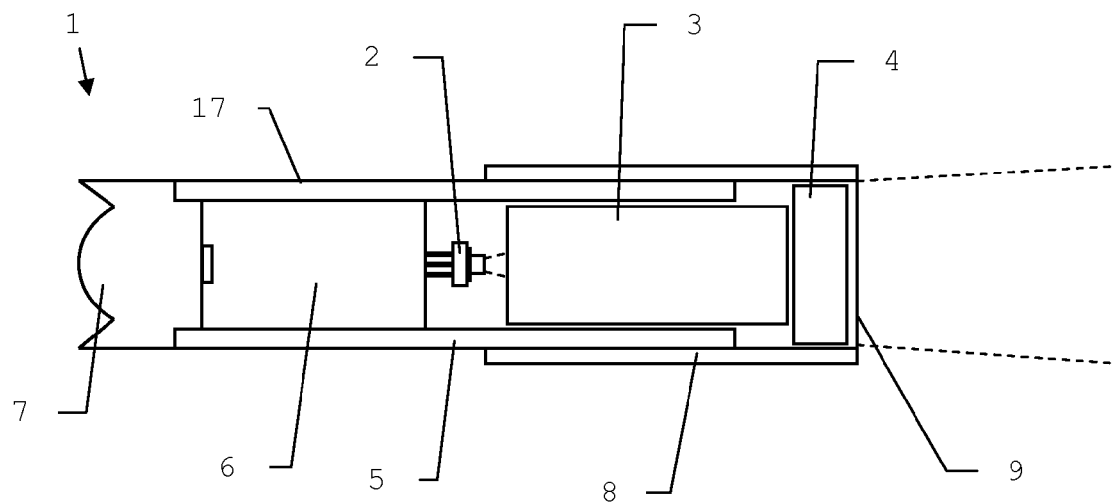
FIG. 3 shows the illumination device arranged in a housing.

FIG. 3 shows a longitudinal section of a portable version of the illumination device 1 according to the invention, in which the components are mounted in a housing 17. The housing consists of a main tube 5, a cover having a switch element 7 and a focusing tube 8 having an exit window 9, the focusing tube 8 being pushed onto the main tube 5. The exit window 9 is in the form of a filter element for preventing the emission of visible radiation. A compartment for an energy source 6, the laser source 2 and the first optical system 3 are arranged in the main tube 5. By actuating the switch element 7, the laser source can be switched on and off. The second optical system 4 is arranged in focusing tube 8. By turning the focusing tube 8 about the longitudinal axis, said focusing tube is displaced by the longitudinal direction of the illumination device 1. The adjustment distance of the focusing tube 8, and hence the angle of divergence of the emitted radiation, are limited by a mechanical stop, which is shown below in FIG. 5.

Figure 4:
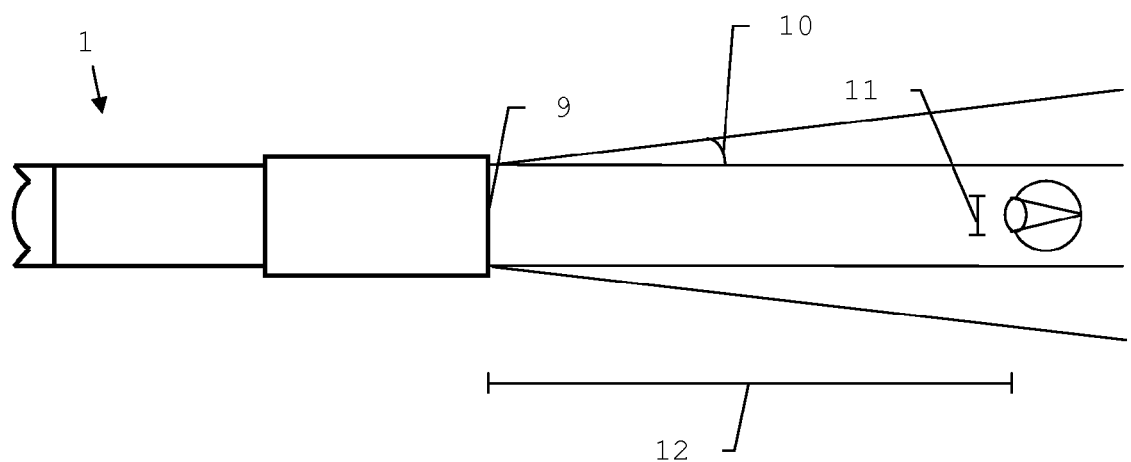
FIG. 4 shows a method of measurement for determining the eye safety of the illumination device.

The method for determining the eye safety of a laser source is shown in FIG. 4 for explanation. For this purpose, the radiant power within a circular aperture 11 of 7 mm diameter is measured at a distance 12 of 100 mm from the exit window 9 as an apparent source of illumination device 1. An intensity of irradiation, which must not exceed a certain value, namely the corresponding MPI value, in order to ensure eye safety is calculated from the measured radiant power.

Figure 5:
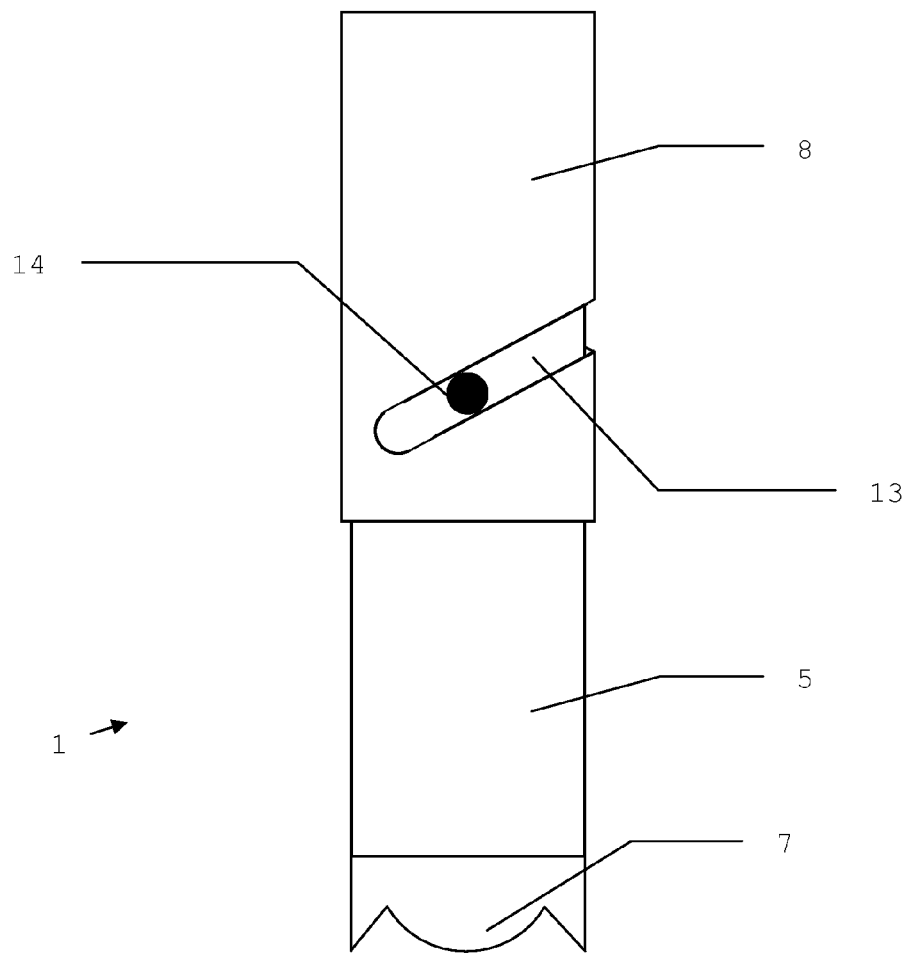
FIG. 5 shows the illumination device with mechanical limitation, according to the invention, of the adjustment distance of the second optical system for limiting the angle of divergence.

FIG. 5 shows an embodiment of the mechanical limitation of the adjustment distance of the focusing tube 8 of an illumination device 1 according to the invention. The focusing tube 8 has a track-like recess 13 which acts as a guide for the adjustment of the focusing tube 8, the focusing tube 8 being pushed onto the main tube 5. Furthermore, a screw 14 is screwed as a guide pin into a hole in the main tube 5 so that the screw head is present in the guide groove 13. The screw head in the guide track-like recess 13 thus produces the displacement of the focusing tube. The movement of the screw head relative to the guide groove 13 and hence the variability of the angle of divergence for ensuring a minimum divergence are limited in a defined manner by a mechanical stop.

Figure 6:
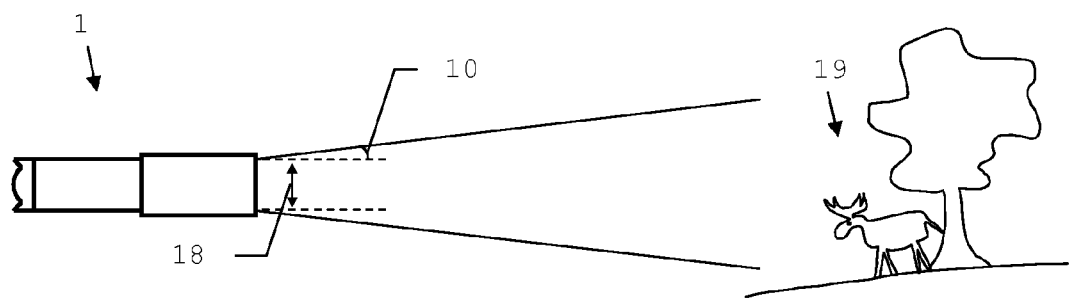
FIG. 6 shows the use of the illumination device with an angle of divergence having a lower limit according to the invention.

FIG. 6 shows the use of an illumination device 1 according to the invention which is safe for the eyes. Illumination device 1 ensures a minimum angle of divergence 10, such as, for example, 80 mrad, and an extensive characteristic 18 of the radiation, such as, for example, a beam cross-section of 20 mm diameter in the case of the emission of radiation, and thus illuminates a target object 19 in a manner safe for the eye, even if the target object is an eye looking into the source.

Owing to the complete and uniform illumination of the second optical system, the beam cross-section of the emitted beam has no pattern at the target object, which may be advantageous. When the beam strikes the target object, however, there is in general scattering of the radiation by the target object, which additionally influences the illumination of the target.

Figure 7:
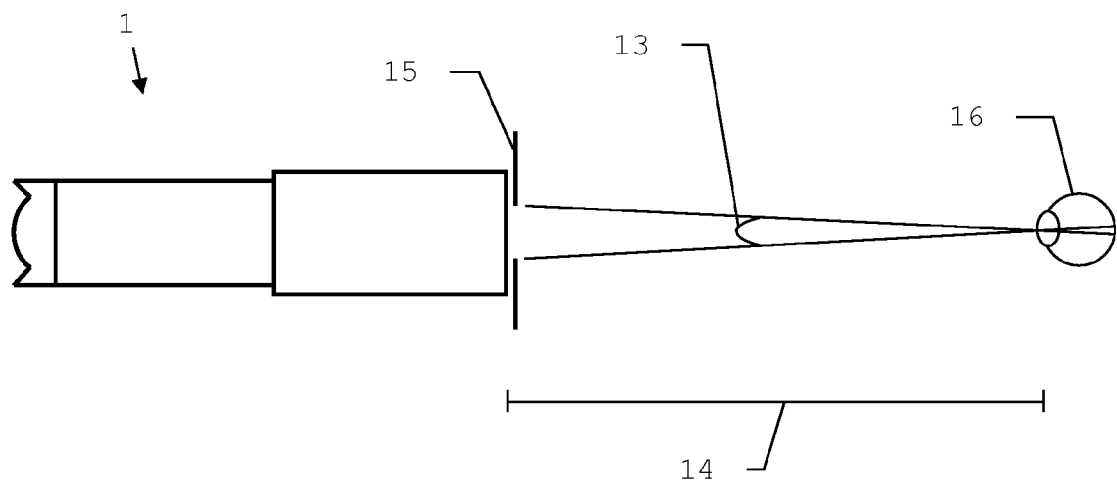
FIG. 7 shows the angular extension of a laser source and the image of the laser source projected into an observer's eye.

By way of explanation, FIG. 7 shows the calculation of the angular extension of an apparent source, which influences the maximum permissible irradiation for ensuring eye safety. The angular extension describes the angle 13 at which an aperture 15 by means of which the output power of the illumination device 1 is reduced to 63%, appears from a point in space. For an analysis of the maximum permissible irradiation, the angular extension is determined by the observation distance from the apparent source 14, but by no distance smaller than 100 mm. The apparent source is projected onto the retina in the eye of the observer 16.

Figure 8:
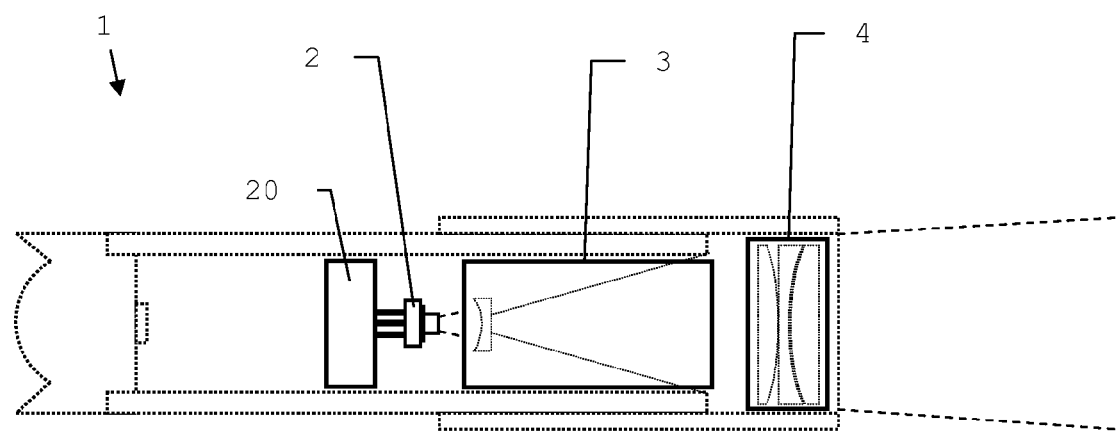
FIG. 8 shows the illumination device comprising a control component for limiting the laser source output power.

FIG. 8 shows the illumination device 1 comprising the laser source 2, first optical system 3, the second optical system 4 and a control component 20 which detects the position of the second optical system 4 and determines therefrom the set angle of divergence of the emitted radiation. On the basis of this angle of divergence, the control component adapts the output power of the laser source for limiting the radiation power of the illuminator.

Figure 9:
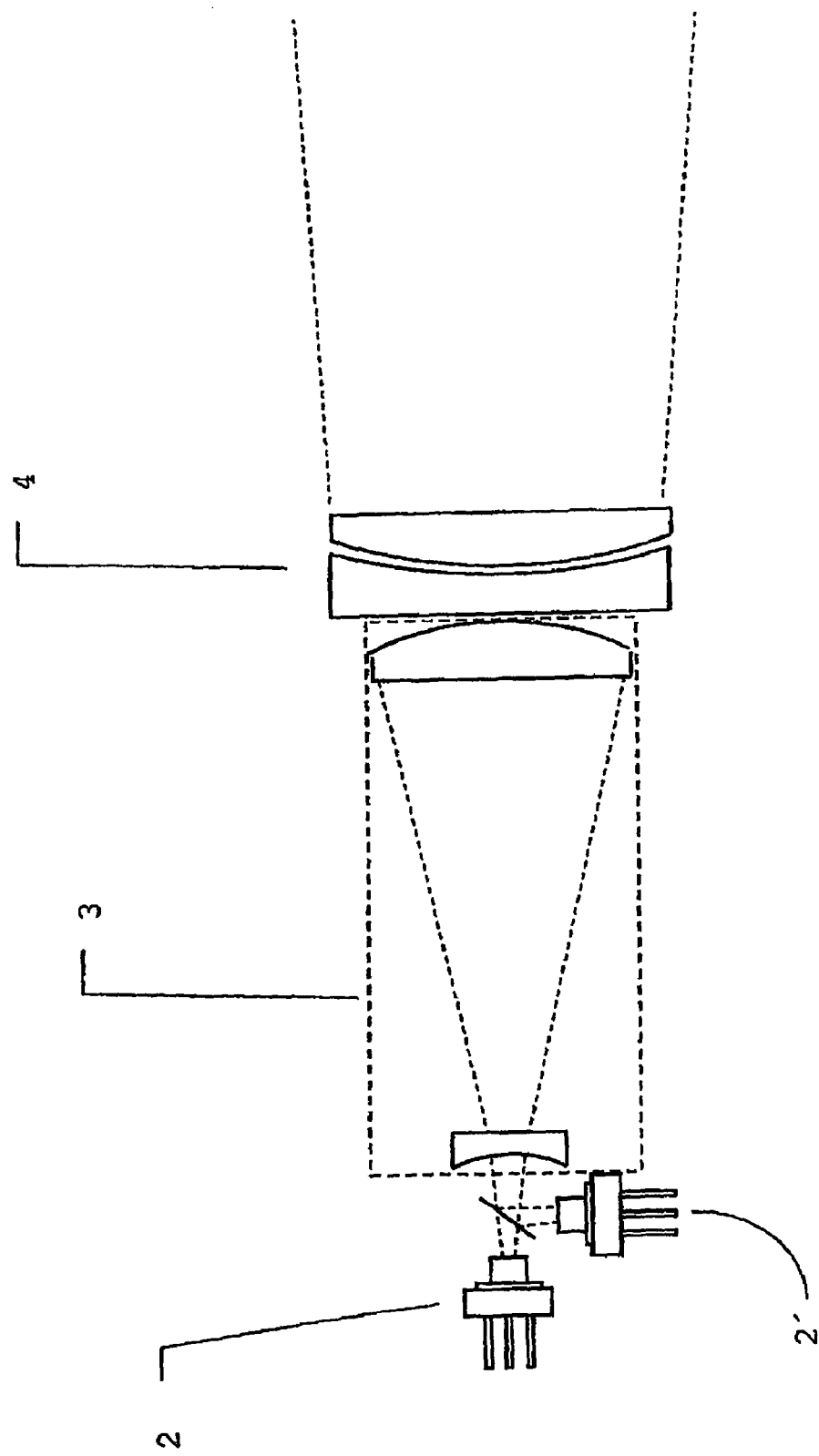
FIG. 9 shows, as a variation of the illustration of FIG. 2, an embodiment of an illumination device with two radiation sources.

FIG. 9 shows, as a variation of the illustration of FIG. 2, an embodiment of an illumination device with two radiation sources 2 and 2'.

Of course, these figures shown represent only examples of possible embodiments. Thus, for example, the components could also be arranged according to the invention as a compact unit for installation in other devices or as a stationary illumination device.

The invention claimed is:

1. A target illuminator for night-vision technology comprising:
    a laser source configured for a radiation power of at least 15 mW, configured to emit radiation having a wavelength $\lambda$ of from 700 nm to 1400 nm and a beam cross-section, and
    a second optical system for divergent emission of radiation, which comprises:
    a first optical system arranged down-circuit of the laser source before the second optical system, configured to increase the beam cross-section before entry into the second optical system to a diameter of at least 5 mm and configured to guide the beam into the second optical system, and
    a defined variability of an angle of divergence of the emitted radiation, the variability being limited for ensuring a minimum divergence,
    wherein an irradiation value B dependent on the wavelength $\lambda$ and on an angular extension $\alpha$ of the beam cross-section on emission of radiation as an apparent source, the irradiation value B being not exceeded with $B = 18 \cdot C_4 \cdot C_6 \cdot C_7 \cdot T_2^{-0.25}$ W/m$^2$, to ensure eye safety, measured at the point of greatest danger but at least at a distance of 100 mm from the apparent source, using a circular aperture of 7 mm diameter present in a beam path of the laser radiation emitted in a divergent manner, where $$C_4 = \begin{cases} 10^{0.002 \cdot (\lambda-700)} & \text{for } 700 \leq \lambda < 1050 \\ 5 & \text{for } 1050 \leq \lambda \leq 1400, \end{cases}$$

$$C_7 = \begin{cases} 1 & \text{for } 700 \leq \lambda < 1150 \\ 10^{0.018 \cdot (\lambda-1150)} s & \text{for } 1150 \leq \lambda < 1200 \\ 8 & \text{for } 1250 \leq \lambda \leq 1400, \end{cases}$$

$$T_2 = \begin{cases} 10 \cdot 10^{(\alpha-1.5)/98.5} & \text{for } 1.5 < \alpha \leq 100 \\ 100s & \text{for } 100 < \alpha, \end{cases}$$

and $$C_6 = \begin{cases} \alpha/1.5 & \text{for } 1.5 < \alpha \leq 100 \\ 66.7 & \text{for } 100 < \alpha. \end{cases}$$

2. The target illuminator as claimed in claim 1, wherein the beam cross-section is at least 5 mm on emerging from the second optical system.

3. The target illuminator as claimed in claim 1, wherein the second optical system is illuminated substantially completely.

4. The target illuminator as claimed in claim 1, wherein the target illuminator is portable.

5. The target illuminator as claimed in claim 1, wherein the variability of the angle of divergence is formed by a displaceability of at least one component of the first or of the second optical system in a direction of a common optical axis and this variability is limited by a limitation of an adjustment distance.

6. The target illuminator as claimed in claim 5, wherein the limitation of the adjustment distance is formed by a mechanical stop.

7. The target illuminator as claimed in claim 6, further comprising two housings at least partly displaceable relative to one another for holding the first and/or second optical system, one housing having a guide groove by means of which a pin which defines the variability of the angle of divergence and is mounted on the other housing is guided so that the guided movement of the pin relative to the guide groove is limited by a stop fixing the minimum divergence.

8. The target illuminator as claimed in claim 1, wherein the second optical system has the following optical elements:
  a positive lens,
  a negative lens and
  a second positive lens,
wherein the lenses are mechanically connected to form a lens system.

9. The target illuminator as claimed in claim 1, wherein the first optical system has at least one of the following optical elements for increasing the beam cross-section:
  a diffusing screen,
  a gradient-optical element,
  a hologram element or
  a cylindrical lens.

10. The target illuminator as claimed in claim 1, wherein the target illuminator is arranged in a housing having a battery compartment, a switch element and an exit window.

11. The target illuminator as claimed in claim 1, further comprising a control component for determining a set angle of divergence and adapting on the basis of this angle of divergence the output power of the laser source to the respective angle of divergence for limiting the irradiation power.

12. Target illuminator as claimed in claim 11, wherein the control component detects the set angle of divergence on the basis of the position of at least one component of the first or second optical system and then adapts the output power of the laser source for limiting the irradiation power.

13. The target illuminator as claimed in claim 10, further comprising a filter element for preventing the emission of radiation of a defined wavelength range, in particular for the filtration of visible radiation, wherein the filter element is in the form of an exit window for protecting the optical system.

14. The target illuminator as claimed in claim 1, which comprises a second radiation source configured to emit laser radiation having a wavelength $\lambda$ of from 700 nm to 1400 nm.

15. The target illuminator as claimed in claim 1, wherein the radiation power of the laser source is at least from 100 to 500 mW.

16. The target illuminator as claimed in claim 1, wherein the second optical system is illuminated uniformly.

\* \* \* \* \*

UNITED STATES PATENT AND TRADEMARK OFFICE
CERTIFICATE OF CORRECTION

| | | |
|---|---|---|
| PATENT NO. | : 7,896,523 B2 | Page 1 of 1 |
| APPLICATION NO. | : 11/696085 | |
| DATED | : March 1, 2011 | |
| INVENTOR(S) | : Drolshagen et al. | |

It is certified that error appears in the above-identified patent and that said Letters Patent is hereby corrected as shown below:

On the title page, change item:

(73) Assignee: Picotronic GmbH, Koblenz (DE)

To:

(73) Assignee: Picotronic GmbH, Koblenz (DE)
             Juergen Drolshagen, Cologne (DE)

Signed and Sealed this
Twenty-fourth Day of January, 2012

David J. Kappos
*Director of the United States Patent and Trademark Office*